Figure 1:
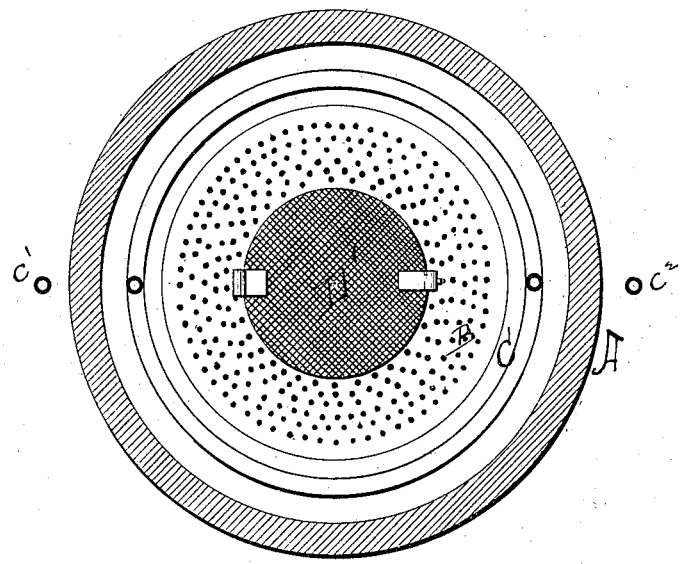

(No Model.)

J. SCHAFHAUS.
PROCESS OF BREWING BEER.

No. 316,067. Patented Apr. 21, 1885.

WITNESSES

INVENTOR
By his Attorney

UNITED STATES PATENT OFFICE.

JEAN SCHAFHAUS, OF NEW YORK, N. Y.

PROCESS OF BREWING BEER.

SPECIFICATION forming part of Letters Patent No. 316,067, dated April 21, 1885.

Application filed March 2, 1885. (No model.)

*To all whom it may concern:*

Be it known that I, JEAN SCHAFHAUS, a citizen of the United States of America, and a resident of the city, county, and State of New York, have invented a new and useful Improvement in the Process of Brewing Beer, of which the following is a specification.

Heretofore beer has been brewed in the following manner: Crushed malt is poured into cold or somewhat warm water, and is mixed with the water by stirring by aid of a mashing-machine. The mixture is gradually heated to a temperature of 60° Reaumur, (167° Fahrenheit,) but not above this. When the proper degree of mashing has been reached, the wort is allowed to rest. The faucets of the mash-tun are opened and the sediment that has settled between the perforated false bottom of the mash tun or kettle and true bottom is returned to the kettle through proper pipes or conduits. This is done until the wort runs off clear. By allowing the sediment to run off in this manner the particles of grain form a filter over the false bottom, thus retaining the impurities of the wort and floating particles of the grain-hulls. When the wort is nearly run off, hot water is then sparged on the mash in the tun, and the water and grains are again stirred up or grubbed by aid of a machine or other means until the contents are thoroughly mixed. The wort is then allowed to rest about ten minutes. It is then drawn off in the manner heretofore described. This process is repeated until the wort drawn off is found to contain only about from one and one-half to three per cent. of saccharine.

It is to be observed that the sparging-water is generally heated to from 65° to 75° Reaumur, (178° to 200° Fahrenheit.) The wort is in due course of time conducted to the hop-kettle, and there boiled with the hops until it has reached the desired stage. By this process the brewer was prevented from obtaining all the saccharine matter contained in the grains in the mash-tun, generally being forced to leave from one and one-half to three per cent. of saccharine matter in the grain, obviously causing great waste of valuable material. If he attempted to extract all of the saccharine matter it resulted in carrying into the clear wort foreign matters that were detrimental to the entire brewing. The time necessarily occupied in evaporating surplusage of water used in sparging the grains in the mash-tun was of vast account, besides the necessarily extended boiling of the wort in the hop-kettle resulted in great loss of aroma and flavor, the same being carried away with the escaping steam. After the wort had been in the hop-kettle a sufficient time the beer was run out of the kettle to the hop-back. The hops remaining in the kettle were sparged with hot water for the purpose of obtaining as much of the beer, &c., remaining in the hops as was possible. (I will here state the absorption of water by hops is about five pounds of water to a pound of hops.) It is unnecessary to observe that the sparging of hops with water did not improve the quality of the beer, since the chemical affinity of pure water is not the same as the affinity between beer and beer. By this process of brewing a large loss of beer is suffered at each brewing.

The object of my invention is, first, to enable the brewer to obtain a larger quantity of beer from the same quantity of material; second, to enable the brewer to produce the beer with greater brilliancy, better flavor and aroma, and stronger body; third, to prevent the sparging of the hops with water; fourth, to save time and labor and use of material from the wort stage of brewing until the finished beer is run into the hop-back. To carry out these objects, I have constructed the apparatus shown and described in the accompanying drawings, in which—

Figure 2:
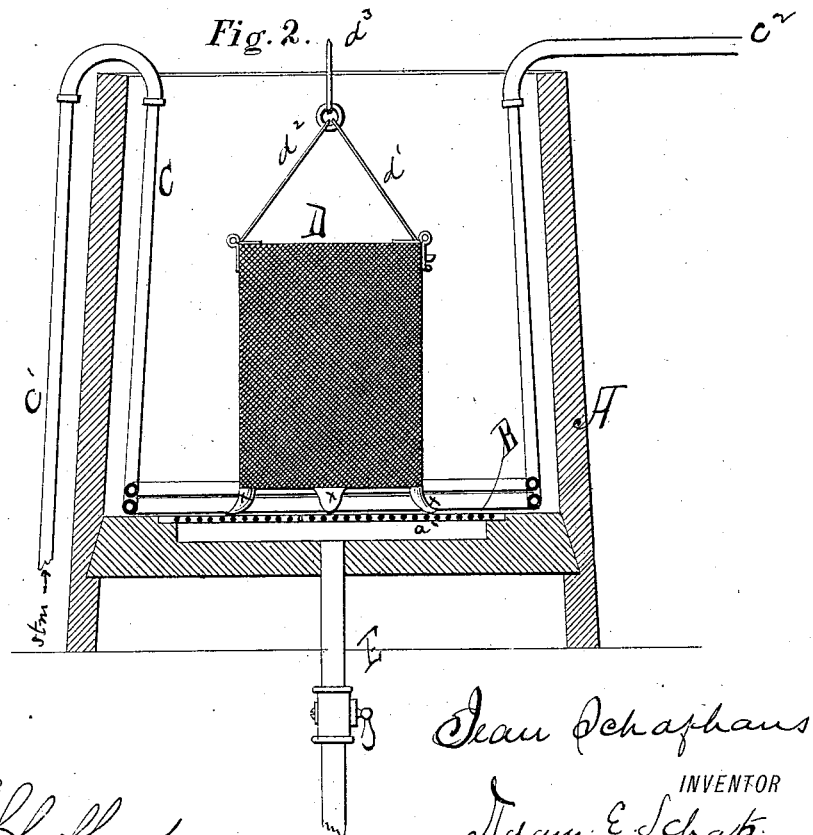

Figure 1 represents a plan view of a tun, A, having a sunk recess, $a'$, over which is fitted a false perforated bottom, B, a coil of steam-pipe, C, with, preferably, two turns, is set into the tun, preferably in the manner shown in the drawings, the end of the pipe, C′, being the steam-inlet and the end $C^2$ being intended as a condense-water outlet. D′ represents the bottom of the wire crib, more fully shown in Fig. 2, in which letters $d'$ $d^2$ $d^3$ represent means of lifting the crib out of the tun. E, run-off faucet. The crib D is provided with stanchions $x$, for the purpose of raising the same above the false bottom, to enable the boiling wort to thoroughly wash all around the parts of the crib. The crib is also provided with a cover provided with suitable means to fasten the same. The crib is perforated, and can be made of any suitable material; but I prefer to construct it of wire-netting, the object of having it perforated being to allow percolation of the liquid through the hops and other contents, it also being intended to carry the hops to the body of the water instead of, as heretofore, floating them on the top.

Like figures in the drawings represent like parts.

In brewing beer under my process I proceed as follows: I pour the ground malt into a mashing-machine, preferably constructed under the patents granted to me by the United States, and numbered 185,702 and 161,708, respectively. This machine is affixed to the mash-tun at the upper chine. In case I use this machine, the ordinary mashing-machine may be dispensed with. The malt is thoroughly mixed with the water and gradually heated to about 60° Reaumur, (167° Fahrenheit.) When the mixture has reached its proper degree of perfection, and the saccharine matter has been thoroughly extracted from the grain, it is allowed to rest for the space of, say, ten minutes. The grain is then repeatedly sparged and the wort drawn off in the manner heretofore described until the wort begins to run cloudy or muddy and the mass remaining in the tun contains but from one and one-half to three and one-half per cent. of extract.

Here note my departure from the old process. Instead of sparging the wort remaining in the tun with water at 60° Reaumur, as heretofore, I sparge the grains with water at 70° Reaumur, (189.5° Fahrenheit,) or more, and after thoroughly stirring the mass I allow the same to rest for about ten minutes, to allow the process of extraction to proceed. I then draw off the wort until I have abstracted almost all of the extract contained in the grains, thus saving the large quantity of wort heretofore lost. I will, for convenience' sake, call the first wort drawn off A—*i. e.*, the wort drawn off until it runs cloudy, as before described—and the second, as above described, B. Wort A, as usual, is pumped into the hop-kettle, and there boiled with the hops. Wort B is pumped into the tun A. (Shown in the drawings.) Into this tun has been placed the crib D, filled with about one pound of hops and one-eighth pound of juniper-berries, quarter pound of salt, and one ounce of elemi gum to about every ten barrels of wort. The wort B is then boiled by means of steam or other means until I have produced a weak but finished beer.

It is obvious that I may dispense with the hops and other ingredients above mentioned, and boil the wort B until it contains as many per cent. of extract as I desire.

Heretofore, in most cases, the hop-kettle could not be started until all, or nearly all, of the wort in the mash-tun had been drawn off and pumped into the kettle, thus causing a great loss of time and materials, and the wort A, by reason of being mixed with the dregs, caused by drawing the wort to the very lowest point of extract from the mash-tun, became cloudy. While the wort B is being treated in the manner above described, the wort A in the kettle has reached its proper point. Heretofore, by reason of the thinning out of the wort A by sparging to obtain as much wort as possible, the last wort drawn from the mash-tun had but from one and one-half to three and one-half per cent. of extract, and it became necessary to boil the wort in the hop-kettle sufficiently long to evaporate water enough to reduce the liquid until the percentage of saccharine desired was gained. It is obvious that the flavor and aroma unavoidably liberated by boiling the liquid was carried off with the escaping steam, which was very detrimental. With my process I avoid excessive boiling of the liquid in the kettle, (and require only about one-half of the time heretofore required in boiling, thus saving about an hour and a half to two hours for each brewing of beer,) since the wort A contains almost the necessary per cent. of saccharine, and it is therefore only necessary to boil the liquid long enough to abstract the desired qualities from the hops.

Under the old process, after the beer has been run from the kettle into the hop-back, then, to obtain the remaining extract contained in the hops remaining in the kettle, they were sparged with hot water. After allowing it to rest a sufficient length of time, the liquid thus obtained was mixed with the rest of the beer in the hop-back, thus adding an extremely light quality of beer containing very little extract to the beer already in the back, and thus reducing the percentage of extract in the main body of the beer.

Instead of using hot water to sparge the hops, I pump the finished beer produced in the vat A from the wort B into the sparger and sparge the hops therewith, thus at once bringing the hops in contact with pure beer to absorb the extract remaining in the hops.

By sparging the hops with either the wort B, whether heated with hops or not, as heretofore described, I have obtained in practice the following results: First, I gain a larger quantity of beer from the same quantity of material with all the original flavor, aroma, brilliancy, and purity; second, there is a vast saving of time, labor, wear and tear of utensils, and increased capacity for production.

The tun A is left uncovered, to facilitate skimming the impurities that float on the surface of the liquid. This is of importance and could not be done under the old process. It prevents impurity heretofore contained in the wort B, last drawn from the mash-tun, being carried into the hop-kettle.

Heretofore when the liquid has been run from the hop-kettle into the hop-back a quantity of hops were thrown loosely into the back for the purpose of flavoring. The hops would float on the top of the liquid and the greatest part of the aroma was lost. Instead of throwing the hops in loosely, I put about one-tenth of the quantity heretofore used into the crib D and set the crib into the back. By this means all of the aroma in the hops is saved.

I am aware that weak wort has been used to sparge partly-exhausted hops, pressed and put into other vessels, and also to boil partly-exhausted hops, and therefore do not claim such process as mine.

Having described my invention and discovery, what I claim as new, and desire to secure by Letters Patent, is—

1. The process of brewing beer, which consists in drawing off the wort from the mash in the tun until it begins to run cloudy, then stirring and sparging the grains remaining in the tun with water heated to from 70° to 75° Reaumur, then drawing off the wort from the grains remaining in the tun until nearly all the extract remaining therein is obtained, then pumping the said wort into a tun into which a crib filled with hops, juniper-berries, elemi-gum, and salt (in proportions mentioned) has been set, then boiling the said wort at a high degree, then using the same for the purpose of sparging the hops remaining in the hop-kettle, substantially as described.

2. The process of brewing beer, which consists in drawing off the wort in the mash-tun until it begins to run cloudy, then stirring and sparging the grains remaining in the tun with water heated to from 70° to 75° Reaumur, then drawing off this latter wort until nearly all extract has been obtained from the grains remaining in the mash-tun, then pumping the wort thus obtained into the tun, then boiling the said wort until the same is clear, then pumping the same into the sparger of the hop-kettle and sparging the hops remaining in the kettle therewith, substantially in the manner described.

In testimony that I claim the foregoing as my invention I have signed my name, in presence of two witnesses, this 21st day of January, 1885.

JEAN SCHAFHAUS.

Witnesses:
FRIEDR. SCHAFHAUS,
JOS. STRACKE, Jr.